United States Patent
Po et al.

(10) Patent No.: US 8,170,110 B2
(45) Date of Patent: May 1, 2012

(54) METHOD AND APPARATUS FOR ZOOM MOTION ESTIMATION (75) Inventors: Lai-Man Po, Hong Kong (HK); Ka Man Wong, Hong Kong (HK); Kwok Wai Cheung, Hong Kong (HK); Ka Ho Ng, Hong Kong (HK); Yu Liu, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 351 days.

(21) Appl. No.: 12/580,429

(22) Filed: Oct. 16, 2009

(65) Prior Publication Data

US 2011/0090963 A1    Apr. 21, 2011

(51) Int. Cl.
H04N 7/12 (2006.01)
H04N 11/02 (2006.01)
(52) U.S. Cl. ............... 375/240.16; 375/240.17
(58) Field of Classification Search ............. 375/240.16
See application file for complete search history.

(56) References Cited

U.S. PATENT DOCUMENTS 6,757,330 B1 * 6/2004 Hsu ............... 375/240.17
7,336,720 B2 * 2/2008 Martemyanov et al. . 375/240.12
7,561,621 B2 * 7/2009 Itoh et al. ............. 375/240.16
2009/0316789 A1 * 12/2009 Sasai et al. ............ 375/240.16
2010/0060798 A1 * 3/2010 Sato et al. ............ 348/699
2010/0092101 A1 * 4/2010 Liang et al. ............ 382/260

OTHER PUBLICATIONS

Hirohisa Jozawa, et al., Two-Stage Motion Compensation Using Adaptive Global MC and Local Affine MC, IEEE Trans. on CSVT, Feb. 1997, vol. 7, No. 1.
Roman C. Kordasiewicz, et al., Affine Motion Prediction Based on Translational Motion Vectors, IEEE Trans. on CSVT, Oct. 2007, vol. 17, No. 10.
Thomas Wiegand, et al., Affine Multipicture Motion-Compensated Prediction, IEEE Trans. on CSVT, Feb. 2005, p. 197-209, vol. 15, No. 2.
Thomas Wiegand, et al., Long-Term Memory Motion-Compensated Prediction, IEEE Trans. on CSVT, Feb. 1999, p. 70-84, vol. 9, No. 1.

* cited by examiner

*Primary Examiner* — Jay Au Patel
*Assistant Examiner* — Jessica Prince
(74) *Attorney, Agent, or Firm* — Ella Cheong Hong Kong; Margaret A. Burke; Sam T. Yip (57) ABSTRACT In accordance with an example embodiment of the present invention, the present invention provides method and apparatus for motion compensated prediction. Apart from translational motion, zoom motion is taken into account by sampling an interpolated frame with one or more selected sampling rates to generate one or more zoom reference frames; matching a frame with the zoom reference frames; and determining one or more motion data.

12 Claims, 9 Drawing Sheets

METHOD AND APPARATUS FOR ZOOM MOTION ESTIMATION

TECHNICAL FIELD

The present application relates generally to digital video processing. In particular, the present application relates to motion estimation for encoding and decoding a digital video.

BACKGROUND

A digital video is composed of frames. Each frame is a snapshot at a time instance. For communications of video, if the video is transmitted frame by frame, this involves a large amount of data and takes a long time.

Since each of the neighboring frames is likely to be a snapshot of a scene with moving objects, they share a lot of similarities. If a frame can be reconstructed from its neighboring frames at the decoder side without having itself transmitted, less data is required.

In order to reconstruct a frame from its neighboring frames, what is required in general is the difference between the frame and its neighboring frames. In other words, the motion of what is snapshot in the frame. The possible motion includes translation, zooming, rotation, and transform. Such a difference or such a motion is represented by motion vectors. The process to determine such a difference or such a motion is known to be motion estimation. The reconstruction based on the motion estimation is known to be motion compensated prediction.

The basic element of a frame is a pixel. The motion is estimated in a scale of pixels. For example, an object in the scene moves to the left by one pixel. However, it is likely that the motion is in a scale of subpixels, so there is subpixel motion estimation which provides the accuracy of motion estimation up to subpixel level.

SUMMARY OF THE INVENTION

Various aspects of examples of the invention are set out in the claims.

Most existing and practical motion compensated prediction techniques implicitly assume pure translational motions in the video contents for effective operation. Zoom motions, namely zoom-in and zoom-out, are always neglected.

Even if it is possible to take zoom motion into accounts for motion estimation, for example, using high order motion models which include translation, rotation and zoom motion, it is impractical to do so due to high complexity. High order motion models include, namely, affine, perspective, polynomial and elastic models. All these higher order motion models require affine parameter estimation and their high complexity has limited the deployment of these higher order motion models in practical applications.

Apart from high complexity for computations, if these higher order motion models are used to generate multiple reference frames as motion compensated prediction candidates which simulate both translation motion and zoom motion, there will be another problem that a large memory or buffer is required to store these reference frames. Consequently, such a large memory requirement makes the approach of using higher order motion models to generate multiple reference frames infeasible.

Regarding the present application, the zoom motion is taken into account for motion estimation in additional to other types of motions. The motion estimation is implemented by matching on the sampled interpolated frames which are generated for subpixel motion estimation in conventional hybrid video coding structure. Specially designed sampling patterns in block matching are used to realize the translation and zoom motion estimation and compensation. Thus, no zoom parameters estimation and additional frame buffers are required in the encoder implementation. The complexity of the decoder is similar to the conventional hybrid video codec that supports subpixel motion compensation. The memory requirement and the computational complexity is low enough that the claimed invention provides a practical solution.

By combining translation and zoom motion components, the resulting motion compensation can effectively handle more real-life motion. Moreover, with block-matching based implementation on the interpolated frame of the subpixel motion estimation, the more general motion model can be easily and efficiently deployed in the existing video coding framework.

The present application provides an invention which does not require affine parameter estimation and extra memory for storing additional reference frames. Zoom parameters are predefined using subpixel motion estimation interpolation scales. Thus the side information is minimal.

Subpixel motion estimation is adopted by advanced video coding standards such as MPEG-4 and H.264/AVC. Therefore, interpolated frames are readily available in a number of commercially available video coding standards, providing the advantages such as: Firstly, no additional memory is required to store the zoom reference frames; Secondly, it is easy to integrate the invention in the present application into commercially available video coding standards.

In accordance with exemplary embodiments of this invention there is provided a method, and an apparatus, that sample an interpolated frame with one or more selected sampling rates to generate one or more zoom reference frames; match a frame with the zoom reference frames; and determine one or more motion data.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
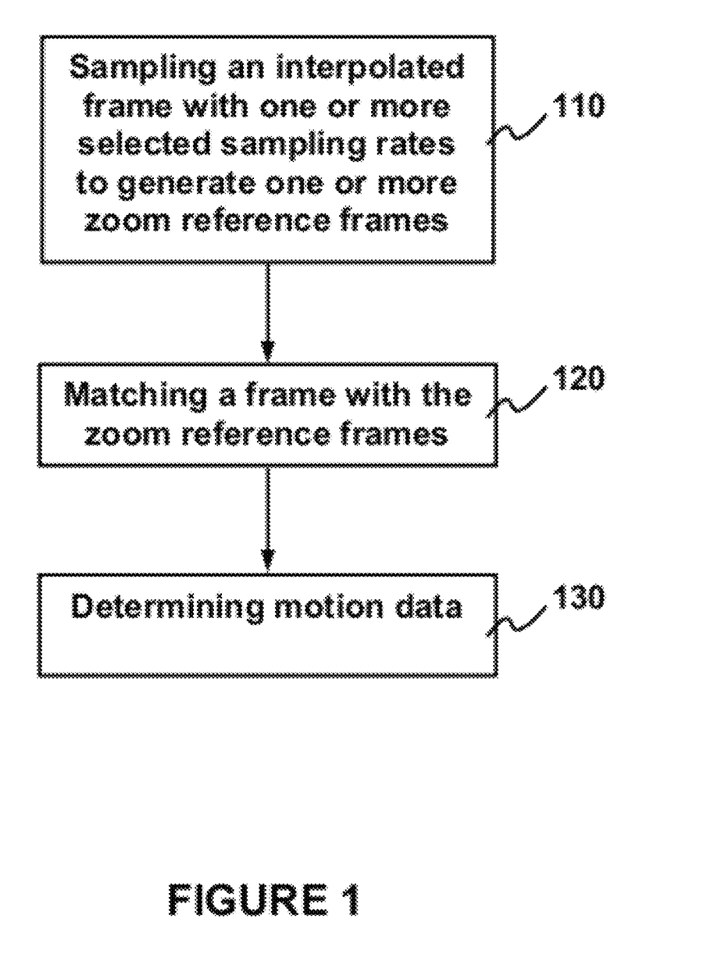
FIG. 1 is a flow diagram that shows a method in accordance with exemplary embodiments of this invention.
Figure 2A:
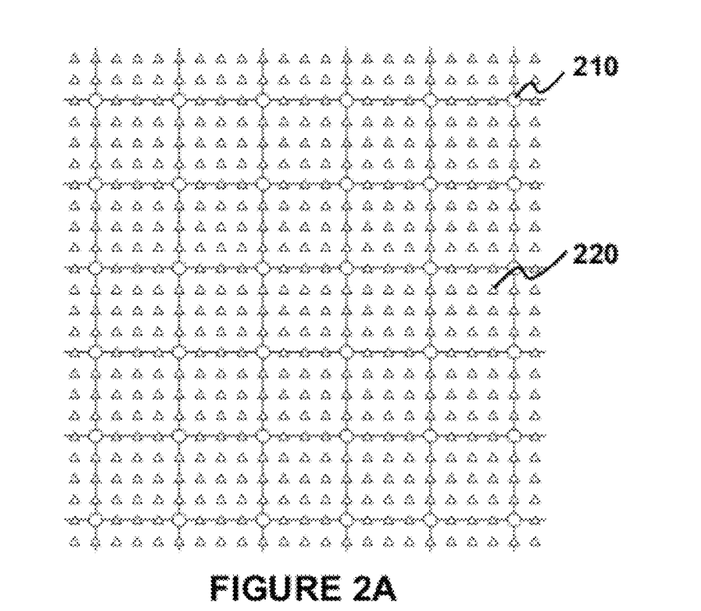
FIG. 2A depicts a portion of an interpolated frame in accordance with an exemplary embodiment.
Figure 2B:
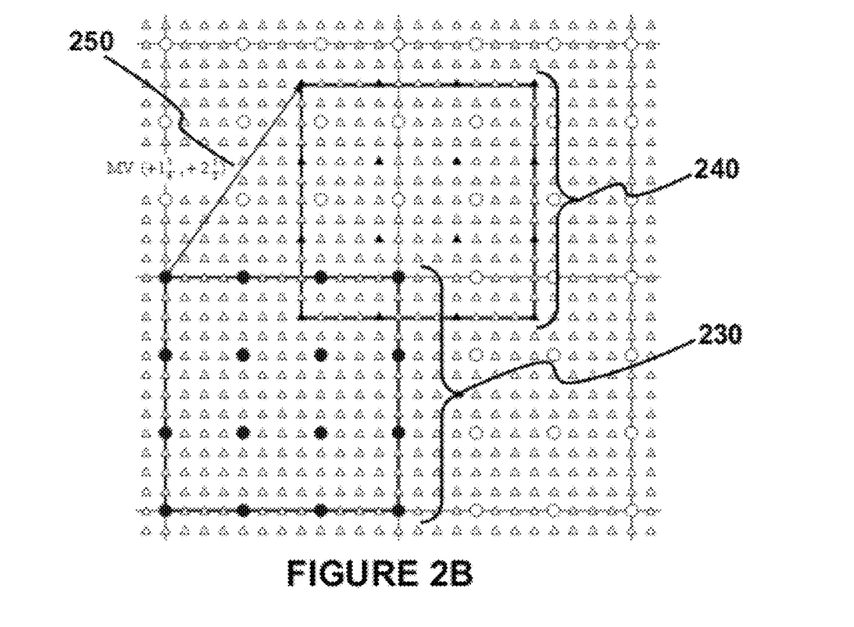
FIG. 2B illustrates how matching is performed in accordance with an exemplary embodiment.
Figure 3A:
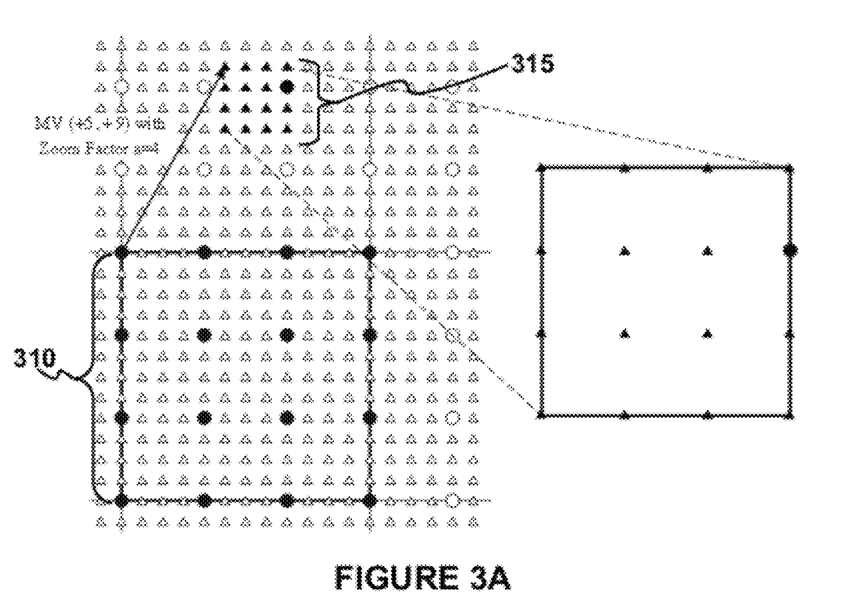
FIGS. 3A through 3C depict an exemplary use of sampling at different selected sampling rates of FIG. 1 in accordance with the non-limiting embodiments of this invention.
Figure 3B:
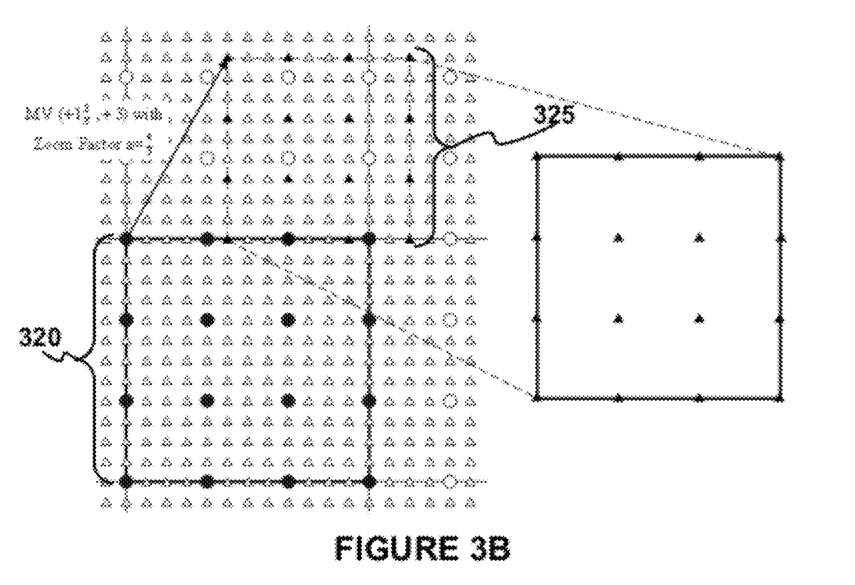
Figure 3C:
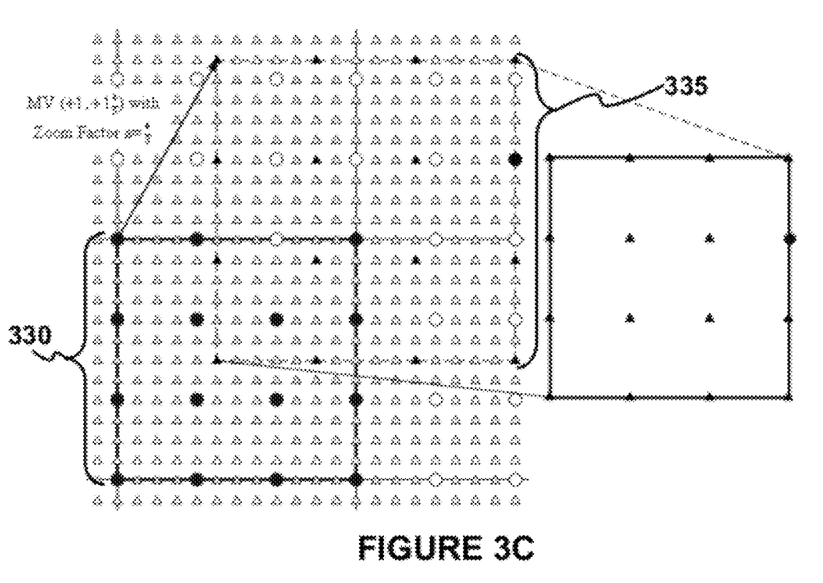

An exemplary embodiment of the present invention and its potential advantages are understood by referring to FIGS. 1 through 3 of the drawings.

FIG. 1 is a flow diagram that shows a method in accordance with exemplary embodiments of this invention. The following steps/procedures/operations are performed: (Block 110) sampling an interpolated frame with one or more selected sampling rates to generate one or more zoom reference frames; (Block 120) matching a frame with the zoom reference frames; and (Block 130) determining motion data.

In accordance with an exemplary embodiment, the interpolated frames are generated by, but are not limited to, any methods of interpolating a frame which is to be referenced by at least one other frame. In addition, the interpolation factor is not limited to any number. Interpolation is to approximate the pixel's color and intensity based on the values at neighboring pixels in a frame. If the interpolation factor is S, then the frame size will be enlarged by S times in both horizontal and vertical directions, for example, a 2×2 frame will become a 2S×2S frame. In general, there are two categories of algorithms to perform interpolation, namely adaptive and non-adaptive. Adaptive algorithms have interpolation varied depending on they are interpolating, for example, edges or smooth texture. Adaptive algorithms include use of probabilistic neural network, non-linear fourth-order methods and others. Non-adaptive algorithms treat all pixels equally, regardless of sharp edges or smooth texture. Non-adaptive algorithms include nearest neighbor, bilinear, bicubic, spline, sinc, lanczos and others. Some are known to be higher order interpolation, such as spline and sinc, through which most image information are retained as more neighboring pixels are taken into consideration. However, the more neighboring pixels are taken into consideration, the more computational intensive the interpolation will be. In a preferred embodiment, for example in case of H.264, the interpolation filter is designed by the use of Wiener such that the most efficient filter kernel is determined based on statistical results.

In accordance with an exemplary embodiment, the interpolated frames are provided from the subpixel motion estimation which is used in advanced video coding standards such as MPEG-4 and H.264/AVC. For subpixel motion estimation, motion estimation with subpixel accuracy is achieved by interpolation. Therefore, the interpolated frames are provided by subpixel motion estimation and no additional process is required.

FIG. 2A depicts a portion of an interpolated frame in accordance with an exemplary embodiment. In FIG. 2A, the circular dots, for example, dot 210, represent original pixels of the reference frame. In another embodiment, dot 210 represent pixels from the reference frame which have been processed by image processing techniques such as low-pass filtering, these pixels are also known as processed pixels. After interpolation, interpolated pixels are generated from the original pixels or processed pixels and the triangular dots, for example, dot 220, represent the interpolated pixels. In this example, the interpolation factor is 4 and the size of the original reference frame is magnified by 4 times, meaning that every 1×1 pixel is padded with interpolated pixels up to becoming a 4×4 block.

In case of subpixel motion estimation, the relationship between the subpixel accuracy of the subpixel motion estimation and the interpolation factor is that: an accuracy of 1/S-pixel requires an interpolation factor S. Therefore, for 1/S-pixel accuracy motion estimation, interpolated frame with an interpolation factor S are readily available.

FIG. 2B illustrates how matching is performed in accordance with an exemplary embodiment. Matching is to locate the best-matched counterpart in the reference frames for the current frame. The current frame is a frame which is to be represented by one or more reference frames and motion data.

The current frame is divided into blocks of any sizes, for example, 4×4, 8×8, 16×16, 32×32, 64×64, 4×8, 8×4, 16×8, or 8×16. The block size is either fixed throughout the frame or variable according to the moving areas in the frame. In this example, the block size is 4×4 and matching is done by comparing each block of the current frame (not shown), such as block 230, with each block of the reference frame (not shown), such as block 240. When the block size is variable, for example in case of H.264 with variable block size feature, the selection of block size (mode selection) is determined by rate-distortion optimization (RDO), one aspect of the present invention is to provide a more accurate motion-compensated prediction for each mode.

Matching is to compare the pixel values such as the intensity values in different blocks pixel by pixel. Every dark circular dot in the block 230 will be compared with every dark triangular dot in the block 240. In general, the comparison is done by any algorithms, but not limited to, sum of squared differences (SSD), sum of absolute differences (SAD), or sum of squared absolute transformed differences (SATD). In this example, the absolute differences between the intensity value of each pixel in the block 230 and the intensity value of each pixel in the block 240 are computed and added together to give a sum of absolute differences. The best matching is determined by searching throughout the reference frame with shift of subpixel locations along both horizontal and vertical axes to find a block with the minimum sum of absolute differences when compared with the block 230 in the current frame.

Let $f_t(s_c), s_c \in \mathfrak{R}^2$, be the original continuous in time and space dynamic scene that is being imaged and the video sequence $f_n(s)$ be the scene after sampling according to the Nyquist criterion in time and space. That means $F_n(s) = f_n(s)$ for integer grid position, $s \in Z^2$. In subpixel matching, the motion vector, an example of the motion data, is determined as $$v_{i,n} = \arg \min_v SAD_{B_{i,n}}(F_n(s), \tilde{f}_{n-1}(s-v)) \qquad (1)$$

where $v \in \mathfrak{R}^2$ is not limited to integer vector components. In practice, the pixel values at subpixel accuracy location $\tilde{f}_{n-1}(s-v)$ can be obtained from interpolation of $\tilde{F}_{n-1}(s)$ to achieve higher prediction performance.

Assuming that block 240 is the best-matched block, then the motion vector is (1¾, 2¼) which refers to the fact that the displacement along the horizontal axis between the best-matched block 240 and the current block 230 is equal to 1¾ and the displacement along the vertical axis between the best-matched block 240 and the current block 230 is equal to 2¼.

FIGS. 3A through 3C depict an exemplary use of sampling of an interpolated frame at different selected sampling rates of FIG. 1 in accordance with the non-limiting embodiments of this invention. In order to generate zoom reference frames for simulating zoom-in and zoom-out motions, the matching is implemented in a way with sampling the interpolated frame at selected sampling rates. The zoom factor refers to the interpolation factor S divided by the sampling rate and the zoom factor determines whether the zoom reference frame represents a zoom-in motion or a zoom-out motion. If the zoom factor is smaller than 1, a zoom reference frame is a reference frame with zoom-out motion. If the zoom factor is greater than 1, a zoom reference frame with zoom-in motion. If the zoom factor is equal to 1, a zoom reference frame is a reference without any zoom motion.

FIG. 3A shows the sampling rate is equal to 1 in accordance with an exemplary embodiment with a block size equal to 4×4. In other words, the sampling is performed at a rate of every 1 subpixel in both horizontal and vertical directions. The 4×4 reference block is generated after 4×4 pixels are sampled. In term of location indices, pixels at (x, y), (x+1n, y), (x, y+1n), (x+1n, y+1n) are sampled whereas n is an integer ranging from 1 through 3. The sampled pixels are represented by dark dots in the reference block 315. The reference block 315 is compared with the dark dots in the current block 310. In this example, the zoom factor is equal to 4, so the zoom reference frame generated by sampling the interpolated frame represents a zoom-in motion.

FIG. 3B shows the sampling rate is equal to 3 in accordance with an exemplary embodiment with a block size equal to 4×4. In other words, the sampling is performed at a rate of every 3 subpixels in both horizontal and vertical directions. The 4×4 reference block is generated after 4×4 pixels are sampled. In term of location indices, pixels at (x, y), (x+3n, y), (x, y+3n), (x+3n, y+3n) are sampled whereas n is an integer ranging from 1 through 3. The sampled pixels are represented by dark dots in the reference block 325. The reference block 325 is compared with the dark dots in the current block 320. In this example, the zoom factor is equal to 4/3 so the zoom reference frame generated by sampling the interpolated frame represents a zoom-in motion.

FIG. 3C shows the sampling rate is equal to 5 in accordance with an exemplary embodiment with a block size equal to 4×4. In other words, the sampling is performed at a rate of every 5 subpixels in both horizontal and vertical directions. The 4×4 reference block is generated after 4×4 pixels are sampled. In term of location indices, pixels at (x, y), (x+5n, y), (x, y+5n), (x+5n, y+5n) are sampled whereas n is an integer ranging from 1 through 3. The sampled pixels are represented by dark dots in the reference block 335. The reference block 335 is compared with the dark dots in the current block 330. In this example, the zoom factor is equal to 4/5 so the zoom reference frame generated by sampling the interpolated frame represents a zoom-out motion In general, a temporal reference frame can be interpolated by an interpolation factor S that may not necessarily be the subpixel motion estimation accuracy. However, in case the interpolation factor S is equal to the subpixel motion estimation accuracy and interpolation has been performed by the subpixel motion estimation, the interpolation need not be repeated and the interpolated frames are readily available. Furthermore, for subpixel motion estimation, the interpolated frame has the maximum resolution S times larger than the original temporal reference frame in the horizontal and vertical dimensions. This interpolated frame can be viewed as a zoom-in frame with zoom factor S. Then, a set of lower resolution frames can be obtained from this maximum resolution frame by different sampling rates. For zooming application, the same sampling rate is applied to both the horizontal and vertical dimensions. Thus, the corresponding horizontal or vertical resolution of the resulting set of zoom reference frames is ranging from S to S/M and the possible zoom factors are given by $$\{S/1, S/2, S/3, \ldots, S/j, \ldots, S/M\} \quad (2)$$

where j is the sampling rate and M is maximum sampling rate. For j<S, the zoom reference frames are zoom-in frames. For j>S, the zoom reference frames are zoom-out frames. In a preferred embodiment, it is not necessary to use all zoom factors provided by Equation (2) as it will generate a heavy loading on motion estimation. It is desirable to have a smaller range of zoom factors for achieving better prediction performance, especially since zoom factors within a short period of time will not vary for a large extent for a video sequence with continuous motions. For a given number of $N_1$ zoom-in factors and $N_2$ zoom-out factors, we should select the following set of zoom factors:

$$\left\{ \frac{S}{S-N_1}, \frac{S}{S-N_1+1}, \cdots, \frac{S}{S-1}, \right. \\ \left. \frac{S}{S}, \frac{S}{S+1}, \cdots, \frac{S}{S+N_2-1}, \frac{S}{S+N_2} \right\} \quad (3)$$

If the subpixel motion estimation accuracy is 1/S-pixel and we set the S=s, then the maximum resolution zoom-in frame will be with s time resolution in both horizontal and vertical directions. For example in ¼-pixel motion estimation, we can select S=s=4. If both the number of zoom-in and zoom-out factors are chosen to be 2 ($N_1=N_2=2$), based on Equation (3) the recommended set of zoom factors are $$\{2, 4/3, 1, 4/5, 2/3\} \quad (4)$$

In general, a temporal reference frame can be interpolated by a factor S that may or may not be the same as the subpixel motion estimation accuracy. In which the sampling rates are selected around the non-zooming sampling rate with additional two zoom-in and two zoom-out levels.

Figures 4A, 4B:
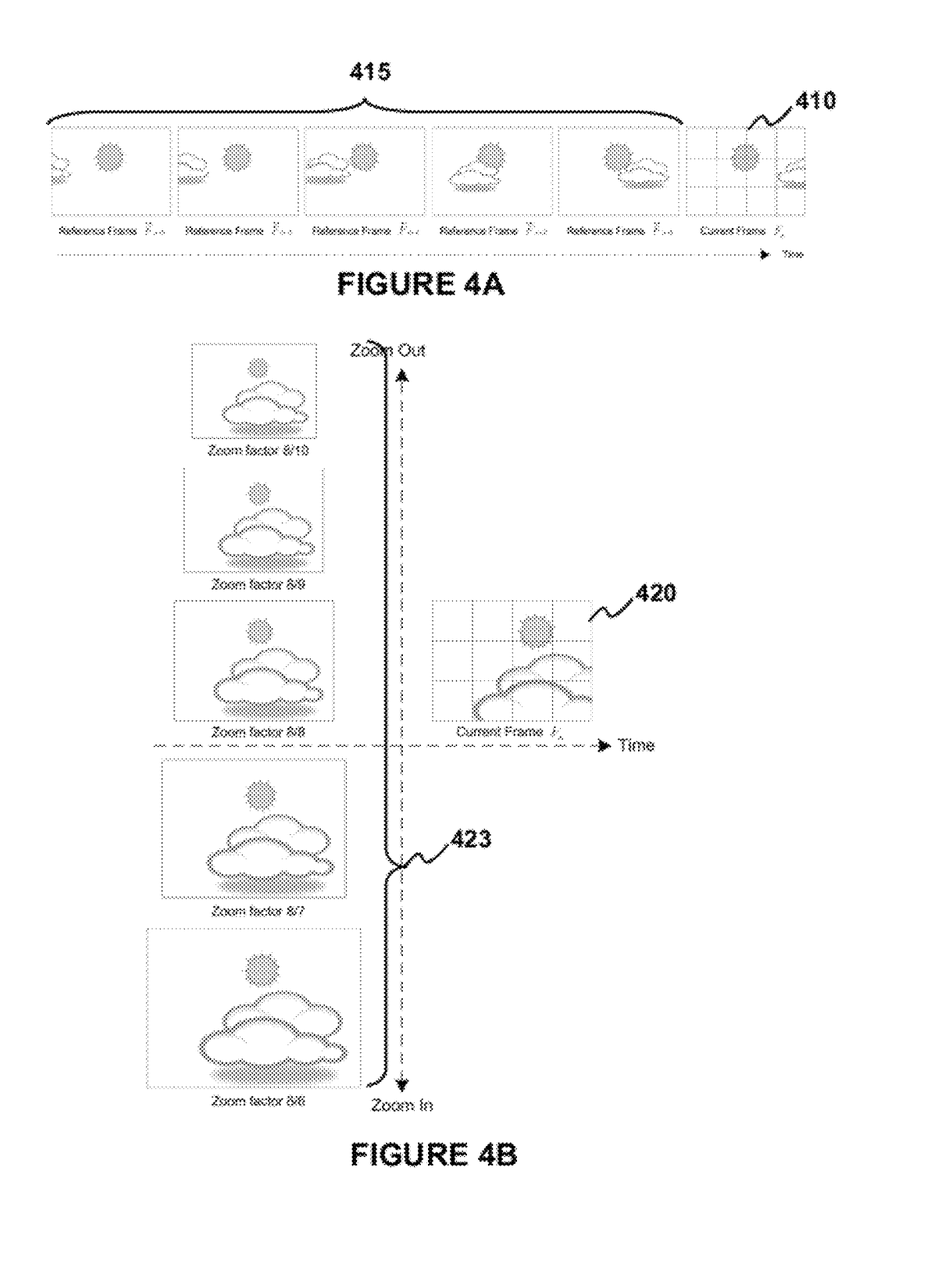
FIGS. 4A through 4C depict an exemplary use of reference frames in accordance with the non-limiting embodiments of this invention.
Figure 4C:
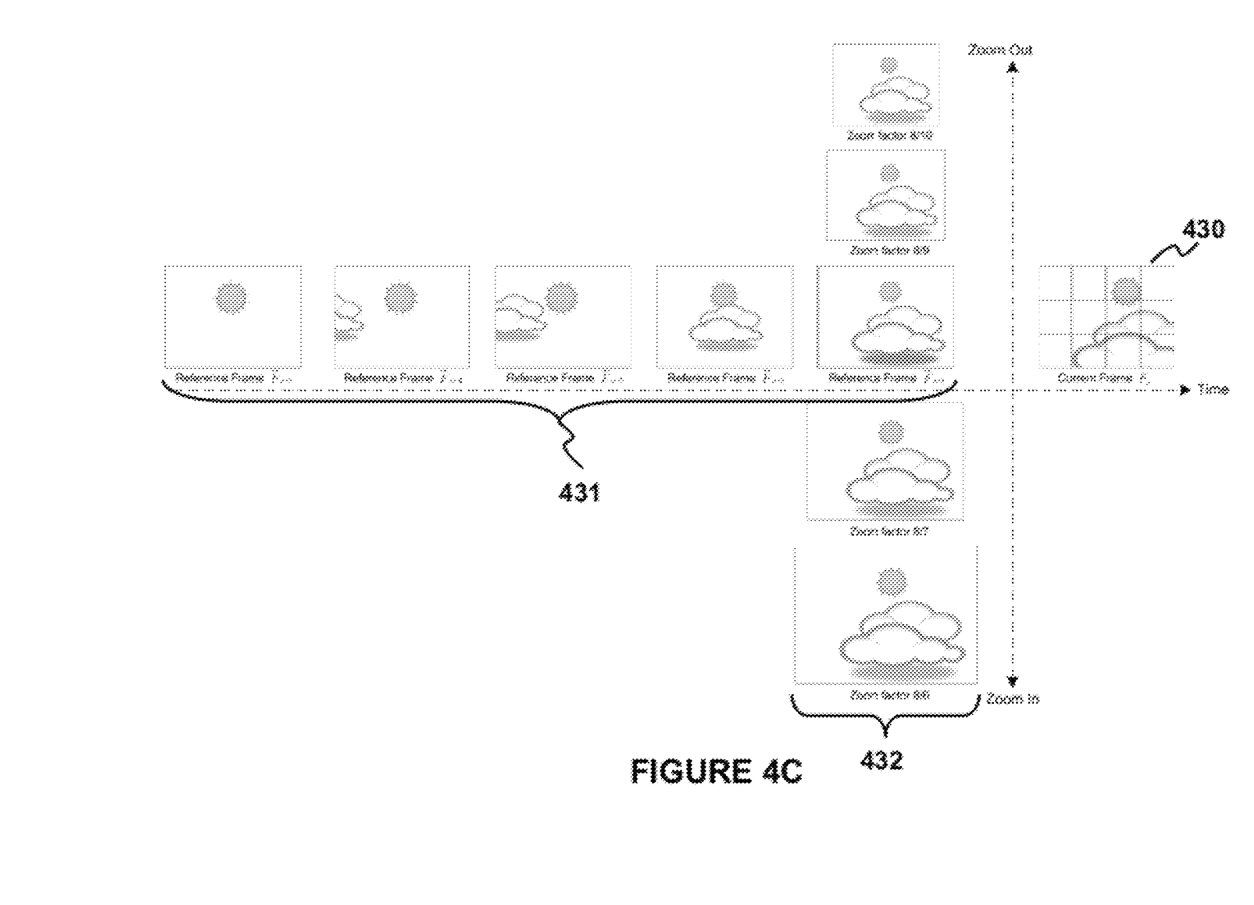

FIG. 4A through 4C depict an exemplary use of reference frames in accordance with the non-limiting embodiments of this invention. FIG. 4A shows that only temporal reference frames 415 are used to encode the current frame 410. The temporal reference frames 415 are frames generated as candidates approximating frames at other time instances in the video for motion prediction. FIG. 4B shows that only zoom reference frames 425 are used to encode the current frame 420. The zoom reference frames 425 are frames generated as candidates approximating zoom motions for motion prediction. Various zoom factors are adopted to generate zoom reference frames 425 representing zoom-in and zoom-out motions. FIG. 4C shows that both zoom reference frames 432 and temporal reference frames 431 are used to encode the current frame 430. Zoom reference frames 432 are generated for one or more temporal reference frames 431. The more zoom reference frames are generated, the high the computational complexity will be.

In a further embodiment of this invention, in order to integrate with H.264/AVC, the motion vectors constituting the spatial displacement, frame reference and zoom factor are required to be coded and then transmitted to the decoder. As an exemplary embodiment, the zoom factor is encoded as a standalone parameter like the reference frame number in H.264.

As the zoom factor is considered as selection of zoomed frame, the zoom factor is embedded with the reference frame number such that the bitstream syntax remains the same as H.264 with a different meaning of reference frame parameter. For example, the zoom parameter is integrated with the reference frame number by offsetting the reference frame number by 16 as listed in the following Table 2 to make a new reference frame parameter. The encoder and decoder extract the new reference frame parameter into reference frame number and zoom parameter. In the example the zoom parameter is integrated with the reference frame number by offsetting the reference frame number by 16, but not limited to 16 and any other value is possible to be used as an offset. The offset value is determined according to, for example, the range for identifying the non-zoomed reference frames that varies among different video coding standards.

TABLE 1

Generation of new reference frame parameter with the integration of zoom factor information

| original frame number | Non-zoom, zoom parameter = 0 | Zoom-in (1), zoom parameter = 1 | Zoom-out (1), zoom parameter = 2 | Zoom-in (2), zoom parameter = 3 | Zoom-out (2), zoom parameter = 4 |
|---|---|---|---|---|---|
| 0 | 0 | 16 | 32 | 48 | 64 |
| 1 | 1 | 17 | 33 | 49 | 65 |
| 2 | 2 | 18 | 34 | 50 | 66 |
| 3 | 3 | 19 | 35 | 51 | 67 |
| 4 | 4 | 20 | 36 | 52 | 68 |
| 5 | 5 | 21 | 37 | 53 | 69 |
| 6 | 6 | 22 | 38 | 54 | 70 |
| 7 | 7 | 23 | 39 | 55 | 71 |
| 8 | 8 | 24 | 40 | 56 | 72 |
| 9 | 9 | 25 | 41 | 57 | 73 |
| 10 | 10 | 26 | 42 | 58 | 74 |
| 11 | 11 | 27 | 43 | 59 | 75 |
| 12 | 12 | 28 | 44 | 60 | 76 |
| 13 | 13 | 29 | 45 | 61 | 77 |
| 14 | 14 | 30 | 46 | 62 | 78 |
| 15 | 15 | 31 | 47 | 63 | 79 |

In H.264/AVC, rate distortion optimized motion search is implemented by minimization of the Lagrangian cost function.

$$(a, m, v_{i,n}) = \arg \min_{a,m,v} \left( SAD_{B_{i,n}}(F_n(s), \hat{f}_m(as - v)) + \lambda_{motion} R(a, m, v) \right) \quad (5)$$

where $\lambda_{motion}$ is the Lagrangian multiplier for motion search used in H.264/AVC and R(a, m, v) is the bitrate associated with a particular choice of motion vector. The motion vector (a, m, v) for each block mode (inter modes of various subblock sizes, intra mode, etc.) is the one that gives minimum Lagrangian cost.

Further in hybrid video coding system such as H.264/AVC, the interpolated frames are generated in the way that the half-sample positions of the interpolated frame are obtained by applying a one-dimensional 6-tap FIR filter horizontally and vertically. Pixel values at quarter-sample, ⅛-sample and etc. are generated by bilinear interpolation of the integer- and half-sample positions.

Note also that, by considering the addition of zoom reference frame as increasing the time window of the time reference frame, the zoom frame index is embedded with the frame number parameter of H.264/AVC bit-stream and it is necessary to ensure the sum of both temporal reference frames and zoom reference frames should not exceed the maximum number of reference frames support in H.264/AVC.

For example, the zoom factor of the reference frame can be embedded to the frame number by offsetting the original frame number by {0, 16, 32, 48, 64} to indicate the reference frame's zoom parameter {0, 1, 2, 3, 4} respectively to fit the H.264/AVC which supports up to 16 reference frames generally and to allow the addition of new parameters without changing the syntax of the bit stream. For example, if this invention is applied to ⅛-subpixel motion estimation accuracy (S=s=8) of H.264/AVC with two zoom frames in each zoom-in and zoom-out factors ($N_1=N_2=2$), then based on Equation (3) the following set of zoom factors should be used:

$$\{4/3, 8/7, 1, 8/9, 4/5\} \quad (6)$$

To represent these zoom factors with use of the offsetting the reference frame's zoom parameter, these actual zoom factors are hard coded in the codec as defined in Table 2.

TABLE 2

Definition of Zoom parameter and associated values in an exemplary implementation

| Zoom parameter | 0 | 1 | 2 | 3 | 4 |
|---|---|---|---|---|---|
| Sampling rate (8x interpolated frame with S = 8) | 8 | 9 | 7 | 10 | 6 |
| Zoom factor | 1 | 8/9 | 8/7 | 4/5 | 4/3 |

Note further that lowpass filtering may also be applied to the interpolated frames before sampling in order to reduce the aliasing effect. Whether lowpass filtering is performed or not is determined by factors such as computational cost, number of prediction candidates being generated and the prediction error including aliasing which will be absorbed in residue coding stage.

Note still further that additional storage compared with the existing codec may be involved if the resolution of the interpolated frame is higher than that of the ¼ or ⅛ pixel frame commonly used in the H.264/AVC codec. In that case, additional storage for an interpolated frame for each reference frame is required.

Figure 5:
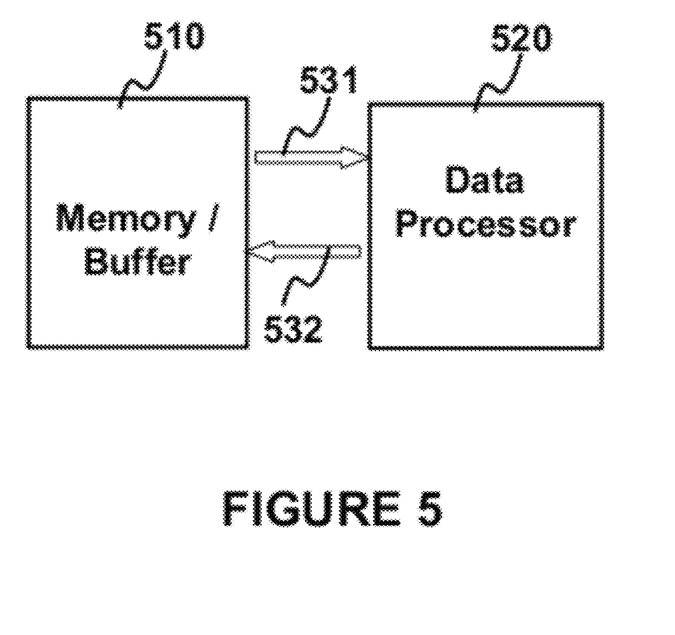
FIG. 5 is a simplified block diagram of an apparatus that is suitable for use with the exemplary embodiments of this invention.

FIG. 5 is a simplified block diagram of an apparatus that is suitable for use with the exemplary embodiments of this invention. The memory 510 may be of any type suitable to the local technical environment and may be implemented using any suitable data storage technology, such as semiconductor-based memory devices, magnetic memory devices and systems, optical memory devices and systems, fixed memory and removable memory. For the purposes of the present invention the memory may be considered to be a computer readable medium as a non-limiting example.

The data processor 520 may be of any type suitable to the local technical environment, and may include one or more of general purpose computers, microprocessors, digital signal processors (DSPs) and processors based on a single-core processor architecture or a multi-core processor architecture, as non-limiting examples.

The data processor 520 is capable to receive input video signals from any means (not shown), for example, any wireless and wired communications channels or any storage devices such as magnetic drives, optical disc, solid states devices, etc. The data processor 520 processes data as described by various non-limiting embodiments in the present application. The data processor determines motion data by sampling an interpolated frame with one or more selected sampling rates to generate one or more zoom reference frames, matching a frame with the zoom reference frames. The processes are performed automatically with pre-set parameters or using programs stored in the memory 510 to control and input the parameters involved so the programs send control signals or data 531 to the data processor 520. While the data processor 520 also makes use of the memory 510 to hold any intermediate data or output 532 such as the interpolated frames or multiple reference frames. Furthermore, any output 532 is accessible by programs stored in the memory 510 in case further processing is required by data processor 510 and it is also possible to send the output 532 to other devices or processors through any means (not shown) such as communications channels or storage devices.

Figure 6:
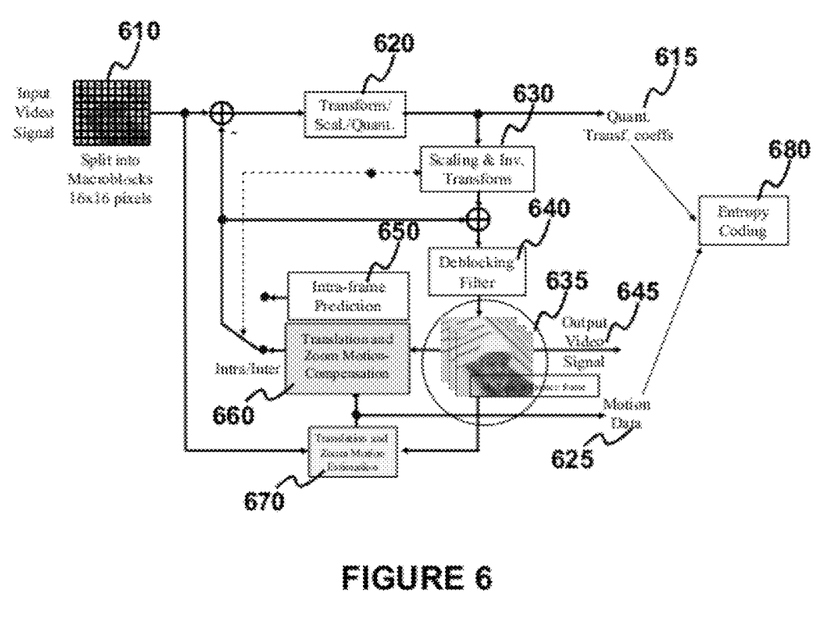
FIG. 6 is a block diagram illustrating an exemplary embodiment of the invention may be used in an exemplary encoder system.

FIG. 6 is a block diagram illustrating an exemplary embodiment of the invention may be used in an exemplary encoder system. A input video signal 610 is processed by motion estimation module 670 which takes into account of zoom motions and translation motions. The motion estimation module 670 uses interpolated frames from sub-pixel motion estimation to generate zoom reference frames. The motion estimation module 670 uses multiple temporal reference frames from a buffer 635. Interpolation is applied to frames stored in the buffer 635 to generate interpolated frames. These temporal reference frames in the buffer 635 are also served as output video signal as they represents frames from different time instances in a video. Before being stored in the buffer 635, these temporal reference frames are processed by modules 620 for processes such as transform, scaling and quantization in order to obtain parameters 615 such as quantization coefficients and transform coefficients, and needs to be subsequently processed by modules 630 for processes such as scaling, inverse transform or dequantization as well as deblocking by a deblocking filter 640.

The motion data 625 obtained from the motion estimation module 670 and the parameters 615 such as quantization coefficients are processed by an entropy coding module 680. An intra-frame prediction module 650 and a motion compensation module 660 are used to perform intra-frame prediction and inter-frame prediction respectively. The motion compensation module receives motion data 625 from the motion estimation module 670 and the multiple temporal reference frames from the buffer 635. After the intra-frame prediction and the inter-frame prediction provide outputs for processes such as scaling, quantization and dequantization, transform and inverse transform, in modules 620 and 630.

Figure 7:
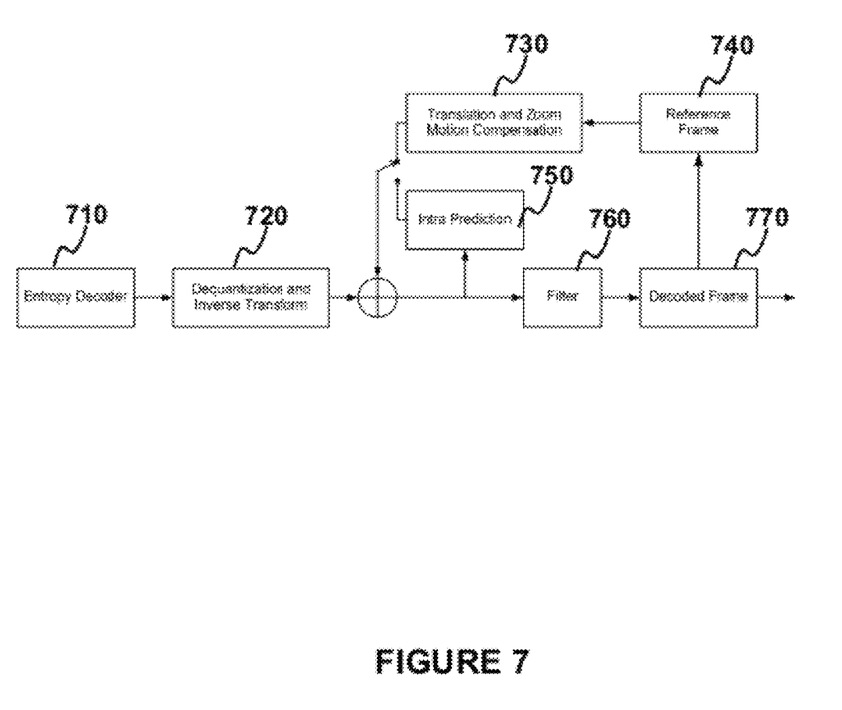
FIG. 7 is a block diagram illustrating an exemplary embodiment of the invention may be used in an exemplary decoder system.

FIG. 7 is a block diagram illustrating an exemplary embodiment of the invention may be used in an exemplary decoder system. At a decoder side, the input signal as received by the decoder is decoded by an entropy decoder 710. After processing by the entropy decoder 710, the decoded signal is processed by dequantization and inverse transform 720. To obtain the decoded frame 770, translation and zoom motion compensation 730 is performed using the decoded frame 770 as the reference frame 740. The resulting signal from the dequantization and inverse transform 720 is processed with the output from either translation and zoom motion compensation 730 or intra prediction 750 to generate a processed signal. The processed signal is further processed by a filter 760 and is used for intra prediction 750. After filtering by the filter 760, a decoded frame 770 is generated.

Without in any way limiting the scope, interpretation, or application of the claims appearing below, a technical effect of one or more of the exemplary embodiments disclosed herein is making the motion compensated prediction with both zoom motions ad translational motions practically feasible. Another technical effect of one or more of the exemplary embodiments disclosed herein is reducing the memory requirement and computational complexity by obtaining zoom reference frames through sampling interpolated frames from sub-pixel accuracy motion estimation. Another technical effect of one or more of the exemplary embodiments disclosed herein is bitrate reduction. The present application provides a technique to perform more accurate motion compensated prediction. When the motion compensated prediction is more accurate, the predicted block will be more similar to the original block and the differences between them will be smaller. Because of the fact that the residue coding encodes the differences between the predicted block and the original block by transform coding, the smaller differences require less bits to encode thus bits can be saved and bitrate reduction is achieved.

Furthermore, the technique of motion compensated prediction as disclosed by the present application is further applicable to higher order motion model like affine, perspective, polynomial and elastic models by using alternative sub-sampling strategy in the motion compensated prediction.

In general, the various embodiments of the apparatus can include, but are not limited to, cellular telephones and other wireless communication appliances, personal digital assistants (PDAs), portable and desktop computers, image capture devices such as digital cameras, audio-video (AV) equipments such as video players, gaming devices, Internet and local area network (LAN) appliances permitting access and possibly browsing, as well as portable units or devices that incorporate combinations of such functions.

Embodiments of the present invention may be implemented in software, hardware, application logic or a combination of software, hardware and application logic. The software, application logic and/or hardware may reside on integrated circuit chips, modules or memories. If desired, part of the software, application logic and/or hardware may reside on integrated circuit chips, part of the software, application logic and/or hardware may reside on modules, and part of the software, application logic and/or hardware may reside on memories. In an exemplary embodiment, the application logic, software or an instruction set is maintained on any one of various conventional computer-readable media. In the context of the present application, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention, these descriptions should not be viewed in a limiting sense. Rather, there are several variations and modifications which may be made without departing from the scope of the present invention as defined in the appended claims.

What is claimed:

1. A method, comprising:
   sampling an interpolated frame with one or more selected sampling rates to generate one or more zoom reference frames;
   matching a block of frame with the zoom reference frames; and
   determining one or more motion data;
   wherein the selected sampling rates being determined by $$\left\{\frac{S}{S-N_1}, \frac{S}{S-N_1+1}, \ldots, \frac{S}{S-1}, \frac{S}{S}, \frac{S}{S+1}, \ldots, \frac{S}{S+N_2-1}, \frac{S}{S+N_2}\right\}$$

with S equaling to an interpolation factor, $N_1$ equaling to number of zoom-in levels and $N_2$ equaling to number of zoom-out levels.

2. The method as claimed in claim 1, wherein the interpolated frames are provided by a sub-pixel motion estimation.

3. The method as claimed in claim 1, further comprising: lowpass filtering the interpolated frame.

4. The method as claimed in claim 1, further comprising: matching a block of frame with one or more temporal reference frames.

5. The method as claimed in claim 1, executed in an encoder.

6. The method as claimed in claim 1, executed in a decoder.

7. The method as claimed in claim 1, executed in a wireless communications device.

8. An apparatus, comprising:
at least one processor; and
at least one memory including computer program code
the at least one memory and the computer program code configured to, with the at least one processor, cause the apparatus to perform at least the following:
sampling an interpolated frame with one or more selected sampling rates to generate one or more zoom reference frames;
matching a block of frame with the zoom reference frames; and
determining one or more motion data
wherein the selected sampling rates being determined by $$\left\{\frac{S}{S-N_1}, \frac{S}{S-N_1+1}, \ldots, \frac{S}{S-1}, \frac{S}{S}, \frac{S}{S+1}, \ldots, \frac{S}{S+N_2-1}, \frac{S}{S+N_2}\right\}$$

with S equaling to an interpolation factor, $N_1$ equaling to number of zoom-in levels and $N_2$ equaling to number of zoom-out levels.

9. The apparatus as claimed in claim 8, wherein the interpolated frames are obtained by interpolation.

10. The method as claimed in claim 8, wherein the interpolated frames are provided by a sub-pixel motion estimation.

11. The apparatus as claimed in claim 8, further comprising: lowpass filtering the interpolated frame.

12. The apparatus as claimed in claim 8, further comprising: matching a block of frame with one or more temporal reference frames.

* * * * *